Patented Jan. 3, 1933

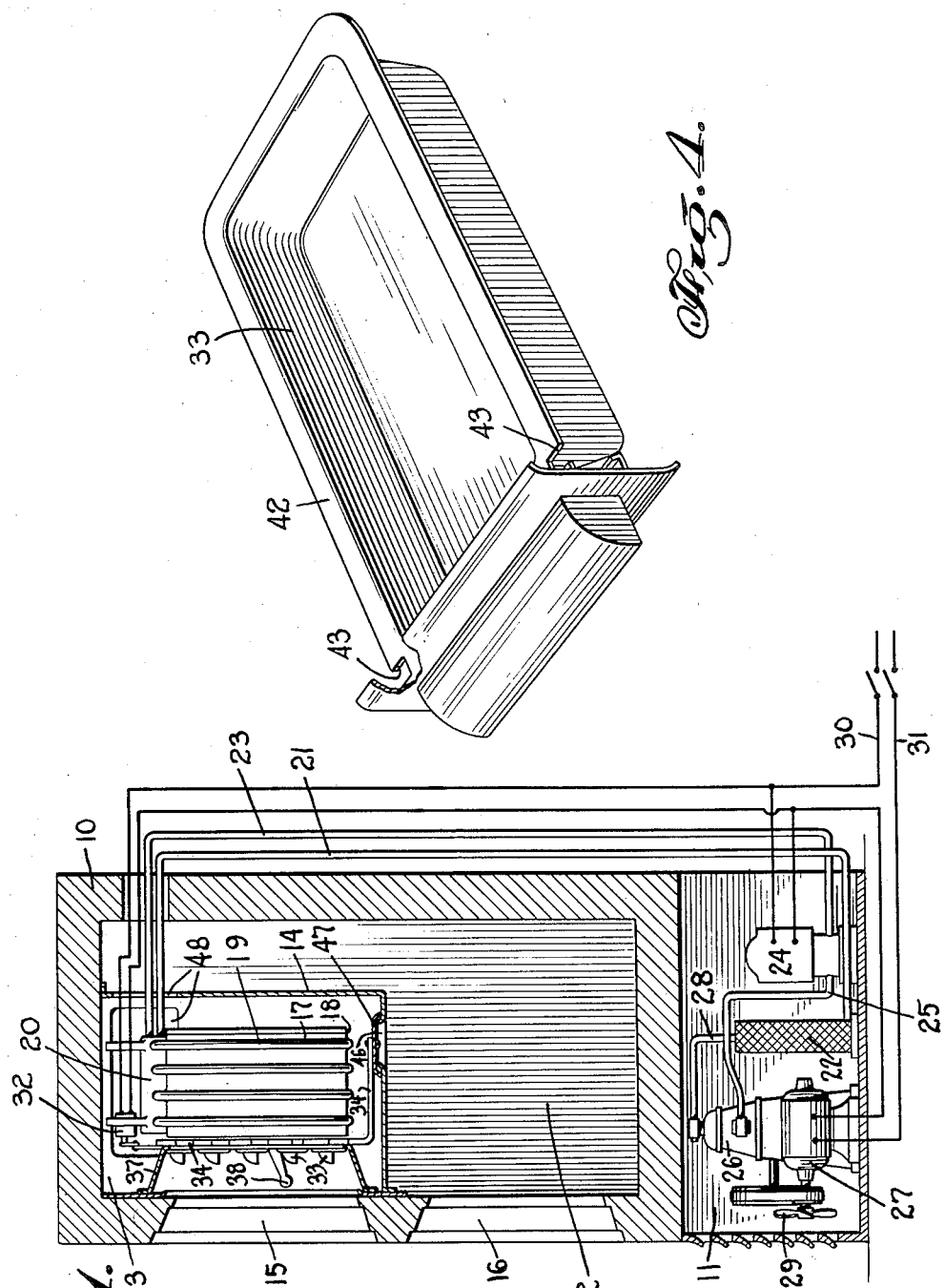

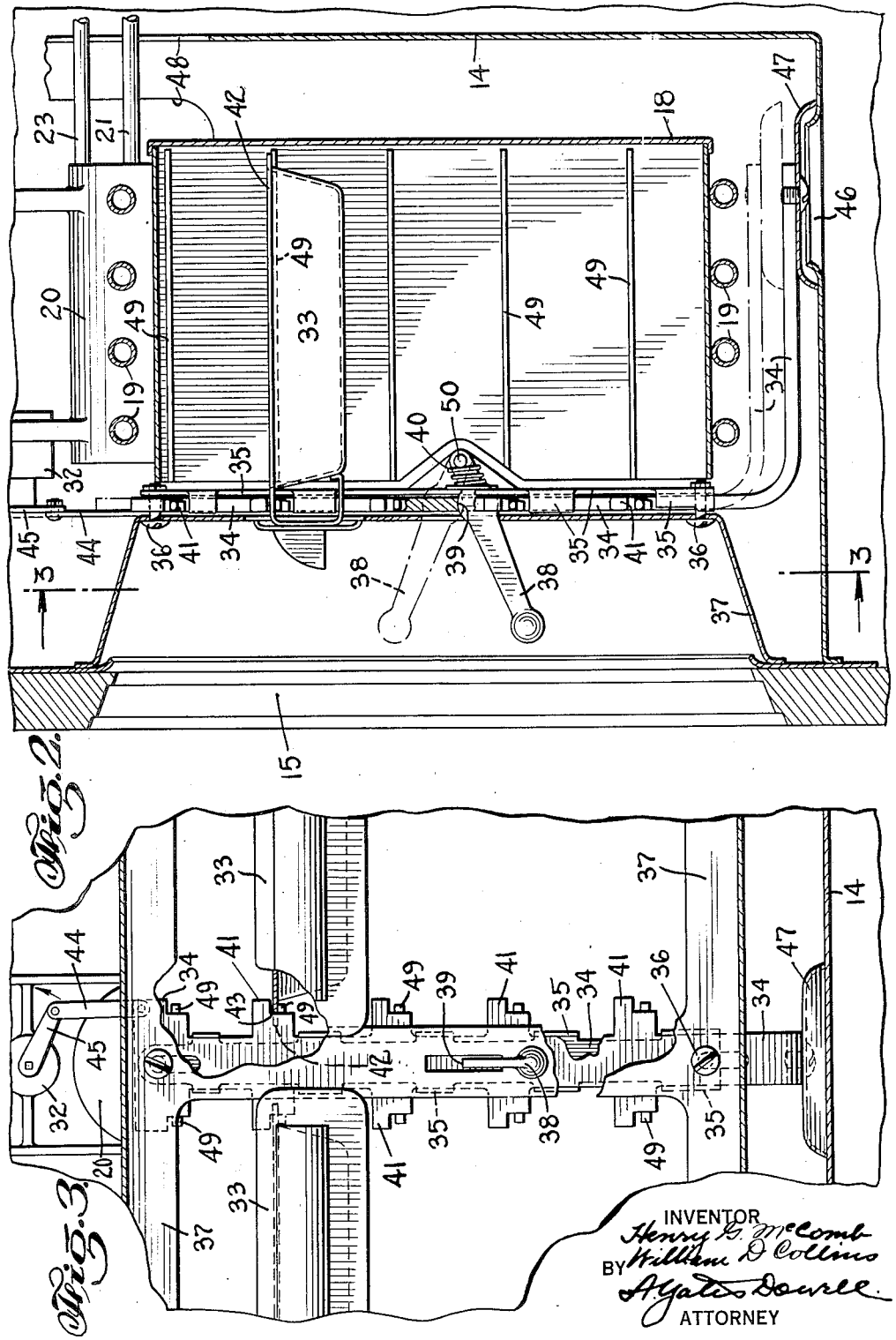

1,892,960

UNITED STATES PATENT OFFICE

HENRY G. McCOMB, OF CHICAGO, ILLINOIS, AND WILLIAM D. COLLINS, OF EVANSVILLE, INDIANA, ASSIGNORS TO SERVEL INC., OF NEW YORK, N. Y., A CORPORATION OF DELAWARE

REFRIGERATION

Application filed August 27, 1930. Serial No. 478,060.

This invention relates to the art of refrigeration and particularly to refrigerating apparatus of the mechanical type as distinguished from ice cooled refrigerators.

Mechanical refrigerators of this type find a large use in the domestic field and here particularly they are called upon to perform two major functions; first, the preservation of food and second, the freezing of ice and desserts. The preservation of food requires a temperature preferably between 40 and 50 degrees F. If the temperature goes above the higher limit propagation of bacteria is greatly increased, while if the temperature falls below the lower limit the food is apt to be injured by becoming frozen. The freezing of ice and desserts, on the other hand, requires a temperature at least below 32 degrees F. These two ranges of temperature are conveniently obtained in the same refrigerator cabinet by placing the water or desserts to be frozen in close proximity to the evaporator while placing the food more or less remote from the evaporator.

At times it is desired to speed up the freezing action and this may be accomplished in refrigerating apparatus of the compression type by operating the compressor continuously and in refrigerating apparatus of the absorption type by increasing the heating effect. In either case this causes a reduced temperature of the evaporator which results in fast freezing of the water or desserts desired to be frozen but it also results in undesirable lower temperatures in the food storage portions of the cabinet.

Also, this increased rate of refrigeration is usually controlled by manually operable devices and hence when the desired freezing has been accomplished the person using the refrigerator may forget to so manipulate the fast freezing control as to return the operation of the apparatus to normal. This, of course, would result in an extremely low temperature being obtained throughout the entire cabinet which might freeze substances contained therein.

This invention contemplates the provision of an interlocked freezing control which accomplishes fast freezing in the manner described above but is so arranged that it is impossible to forget to return the operation of the machine to normal when the desired freezing has been accomplished. Before an ice or dessert tray may be removed it is necessary to move the control lever to such a position as will return the operation of the apparatus to normal.

This invention also embodies the provision of means for preventing the low temperature existing in the neighborhood of the evaporator during periods of fast freezing from being communicated to the food storage parts of the cabinet. This means is automatically operated by the handle which controls the fast freezing.

Thus there is provided a refrigerating cabinet capable of freezing ice or desserts in extremely short periods of time without abnormally low temperatures existing in the food storage portions of the cabinet and means are provided whereby the increased refrigerative effect necessary for the fast freezing cannot be allowed to continue after the desired freezing has taken place.

These, as well as further objects and advantages of our invention, will be apparent from the following specification and accompanying drawings, which form a part thereof and on which:

Fig. 1 is an elevational view partially in cross-section, of a refrigerator cabinet embodying a preferred form of our invention;

Fig. 2 is an elevational view partially in cross-section, of a portion of the apparatus shown in Fig. 1;

Fig. 3 is a cross-sectional view, partially broken away, taken on the line 3—3 of Fig. 2; and Fig. 4 is a perspective view of a preferred form of ice tray.

Referring more particularly to Fig. 1 reference character 10 designates generally a refrigerator cabinet, the lower part of which may be conveniently used to form the machinery compartment 11 wherein is housed various members constituting a part of a mechanical refrigerating apparatus. The members shown as placed in compartment 11 may, of course, be placed elsewhere, such as, for instance, on top of the cabinet or entirely removed therefrom, as in the basement.

The upper part of cabinet 10 comprises a food storage compartment 12 and a freezing compartment 13 separated from each other by partitioning walls 14. Walls 14, with adjacent walls of cabinet 10 form a box-like enclosure in the upper part of the cabinet. Circulation of air induced by the cooling thereof, may take place between compartments 12 and 13 through apertures 48 formed near the top of the partioning walls and an aperture 46 formed in the bottom wall. Admission to freezing compartment 13 and food storage compartment 12 may be had through openings 15 and 16 respectively which are normally closed by suitable doors. Food storage compartment 12 is provided with a number of shelves (not shown) in the ordinary manner.

Within freezing compartment 13 is positioned what may be termed a chilling unit which is designated generally by reference character 17. Chilling unit 17 comprises a box-like ice tray retaining chamber 18 around which are placed evaporator coils 19. Coils 19 communicate with a float valve chamber 20 which is placed above chamber 18. The coils and the float valve chamber together are referred to as an evaporator member. Float valve chamber 20 is supplied with liquid refrigerant through a conduit 21, the other end of which communicates with a condenser 22 located within machinery compartment 11. Vaporous refrigerant is withdrawn from float chamber 20 through a conduit 23 and passes through a pressure responsive electric switch 24 and thence through a conduit 25 to the suction side of a compressor 26.

Compressor 26 is operatively connected to an electric motor 27 and serves to compress the vaporous refrigerant received through conduit 25. The refrigerant thus compressed passes through a conduit 28 to condenser 22, where it is condensed to liquid due to the cooling action of a current of air circulated past the condenser by means of a fan 29 mounted on the shaft of motor 27. The liquid refrigerant passes from condenser 22 through conduit 21 to float chamber 20, where its pressure is reduced, whereupon it evaporates in coils 19 and chamber 20 and thus absorbs heat.

Electric motor 27 is operated by current furnished from any suitable source through the conductors 30 and 31. Conductor 31 passes directly to one terminal of the motor while conductor 30 passes through pressure responsive switch 24 and another switch 32, conveniently referred to as a fast freezing control switch, these two switches being electrically connected in parallel as is clearly shown in Fig. 1. Hence if either switch 24 or 32 is closed, current will be supplied to the motor.

The temperature maintained by chilling unit 17 is a function of the pressure existing in evaporator coils 19 and float chamber 20. Substantially this same pressure exists in conduit 23 and hence acts upon pressure responsive switch 24. Switch 24 is so adjusted as to close the circuit and start motor 27 when a predetermined high pressure is reached in evaporator 19 and to open, and thus stop the motor, when a predetermined low pressure exists in the evaporator. Thus the temperature of the evaporator fluctuates between certain limits which are so selected as a maintain a temperature in the food storage compartment 12 of between 40 and 50 degrees F. Such an evaporator temperature is sufficiently low to freeze water placed in trays 33 which are removably positioned in ice tray retaining chamber 18, and supported therein on slides 49. However, the time required for freezing water or other substances under these conditions may be longer than is desired and hence means are provided for speeding up the freezing action.

Pressure responsive switch 24 may be replaced by a switch, similarly connected in the motor circuit, but actuated by a thermostat placed in contact with or adjacent to the chilling unit or even in food storage compartment 12.

As shown more clearly in Figs. 2 and 3, a bar 34 is slidably positioned in a guide member 35 which guide member is secured in front of ice tray retaining chamber 18. Chamber 18, as shown, is constructed to accommodate two vertical rows of ice trays and bar 34 and guide 35 are placed centrally in front of chamber 18 so as to be between the vertical rows of trays. In case chamber 18 were designed to accommodate a single vertical row of trays, bar 34 and its guide 35 would be placed on one side of the chamber. Guide 35 is secured by means of bolts 36 to a shield 37 which is in turn secured to the inner wall of compartment 12 around door opening 15.

Pivotally attached at 50 to guide 35 is a control lever 38 which projects through bar 34 and engages the bar in a ball and socket joint 39. Thus when lever 38 is in position as shown by solid lines in Fig. 2 bar 34 will be in its lowermost position, while when lever 38 is raised to the position shown in dotted lines in Fig. 2, bar 34 will be raised to its uppermost position, likewise shown by dotted lines. A coil spring 40 is retained around lever 38 between its point of pivotal attachment 50 to guide 35 and ball and socket joint 39 and serves to retain lever 38 in either its extreme lower or upper position but tends to prevent the lever from remaining in intermediate positions.

Bar 34 is provided with laterally extending projections or detents 41 which are of sufficient length to extend over the edge 42 of the adjacent ice tray. Edges 42 of each ice tray are formed with notches 43 therein, one of which, when the tray is in its proper position within chamber 18, is directly in line with a projection 41 on bar 34. Notches 43 are provided in both sides of each tray so that each tray may be placed in either side of chamber 18. When the bar is in its upper position projections 41 are above the edges 42 of the ice trays and hence the trays may be slid into or out of the chamber on supporting slides 49. However, when the bar 34 is lowered projections 41 engage notches 43 and the trays may not be removed without first lifting the bar.

Pivotally attached to the upper end of bar 34 is a member 44, the other end of which is pivotally attached to an arm 45 on fast freezing control switch 32. The electric circuit through switch 32 is closed when arm 45 is in the lower position and is open when the arm is in the upper position. The lower end of bar 34 is bent substantially at right angles and extends between the bottom of chamber 18 and the lower partitioning wall 14. A closure member 47 is attached to the lower end of bar 34 and serves to close aperture 46 when the bar is in its lower position but allows air circulation through the apertures when the bar is in its upper position.

Thus it will be seen that when rod 38 is in its lower position the ice trays will be locked in position in chamber 18, switch 32 will be closed and the closure member 47 will prevent the circulation of air through opening 46. Switch 32 being closed, motor 27 will run continuously, regardless of the fact that switch 24 may be opened, and hence a temperature lower than normal will be obtained in evaporator 19 and freezing compartment 13. This will freeze the ice or desserts in trays 33 at a more rapid rate than is ordinarily the case but this lowered temperature will not be readily communicated to food storage compartment 12 due to the fact that opening 46 is closed and circulation of air between compartment 12 and 13 is thus prevented. Before any of the trays 33 may be removed it is necessary to raise bar 34 by means of lever 38 which also opens switch 32 and returns the operation of the apparatus to normal and pressure responsive switch 24 resumes control. Hence, it is impossible to forget to stop the fast freezing action when the desired freezing has been accomplished as it is impossible to remove the frozen material without first stopping the fast freezing action.

While a preferred embodiment of this invention has been shown and illustrated, it is to be understood that modifications thereof fall within its scope. For instance, this invention may be applied to absorption refrigerating apparatus which receive their energy in the form of heat, either electric, gas or oil. In so doing it is only necessary to substitute for switch 32 a device which will maintain a maximum supply of heat to the generator of such an absorption refrigerator independently of the control of the ordinary thermostat or other temperature control. This invention is to be limited only by the appended claims when viewed in the light of the prior art.

Having thus described our invention, what we claim is:

1. In a refrigerating apparatus, an evaporator member, means to supply refrigerant to said evaporator member, means to withdraw vaporous refrigerant from said evaporator member, normally operable means for controlling the withdrawal of vaporous refrigerant from said evaporator member to control temperature, freezing trays removably positioned adjacent to said evaporator member, and manually operable means to control the withdrawal of vaporous refrigerant from the evaporator member independently of said normally operable means and for simultaneously preventing removal of said freezing trays.

2. A refrigerator comprising an evaporator member, means to supply refrigerant to said evaporator member, means to withdraw vaporous refrigerant from said evaporator member, means for controlling the withdrawal of vaporous refrigerant from said evaporator member, freezing trays removably positioned adjacent to said evaporator member, manually operable means for maintaining a continual withdrawal of vaporous refrigerant from said evaporator member and for simultaneously preventing the removal of said freezing trays.

3. A refrigerator comprising an evaporator member, means for supplying refrigerant to said evaporator member, means for withdrawing vaporous refrigerant from said evaporator member, normally operable means for controlling the temperature of said evaporator, freezing trays removably positioned adjacent to said evaporator, and manually operable means for controlling the temperature of said evaporator member independently of said normally operable means and for simultaneously preventing the removal of said freezing trays.

4. A refrigerator comprising an evaporator member, means for supplying refrigerant to said evaporator member, means for withdrawing vaporous refrigerant from said evaporator member, means for maintaining a normal temperature of said evaporator member, freezing trays removably positioned adjacent to said evaporator, and manually operable means for obtaining a subnormal temperature of said evaporator member and for simultaneously preventing the removal of said freezing trays.

5. A refrigerator comprising a food storage compartment, a freezing compartment, walls separating the aforesaid compartments and having openings formed therein, an evaporator member in said freezing compartment, means for supplying refrigerant to said evaporator member, means for withdrawing vaporous refrigerant from said evaporator member, normally operable means for controlling the withdrawal of vaporous refrigerant from said evaporator member, freezing trays removably positioned adjacent to said evaporator member, and manually operable means for controlling the withdrawal of vaporous refrigerant from said evaporator member independently of said normally operable means and for simultaneously preventing the removal of said freezing trays and closing one of said openings.

6. A refrigerator comprising a food storage compartment, a freezing compartment, walls separating the aforesaid compartments and having openings formed therein, an evaporator member in said freezing compartment, means for supplying refrigerant to said evaporator member, means for withdrawing vaporous refrigerant from said evaporator member, means for controlling the withdrawal of vaporous refrigerant from said evaporator member, freezing trays removably positioned adjacent to said evaporator member, and manually operable means for maintaining a continual withdrawal of vaporous refrigerant from said evaporator member and for simultaneously preventing the removal of said freezing trays and for closing one of said openings.

7. A refrigerator comprising a food storage compartment, a freezing compartment, walls separating the aforesaid compartments and having openings formed therein, an evaporator member in said freezing compartment, means for supplying refrigerant to said evaporator member, means for withdrawing vaporous refrigerant from said evaporator member, normally operable means for controlling the temperature of said evaporator, freezing trays removably positioned adjacent to said evaporator, and manually operable means for controlling the temperature of said evaporator member independently of said normally operable means and for simultaneously preventing the removal of said freezing trays and for closing one of said openings.

8. A refrigerant comprising a food storage compartment, a freezing compartment, walls separating the aforesaid compartments and having openings formed therein, an evaporator member in said freezing compartment, means for supplying refrigerant to said evaporator member, means for withdrawing vaporous refrigerant from said evaporator member, means for maintaining normal temperatures of said evaporator member, freezing trays removably positioned adjacent to said evaporator member, and manually operable means for obtaining a subnormal temperature of said evaporator member and for simultaneously preventing the removal of said freezing trays including mechanism for closing one of said openings.

9. A refrigerator comprising a chilling unit comprising evaporator coils and an ice tray retaining chamber, means to supply refrigerant to said evaporator coils, means to withdraw vaporous refrigerant from said evaporator coils including a compressor, an electric motor operatively connected to said compressor, an electric circuit for said motor, a first switch in said circuit, means for operating said switch so as to maintain normal temperatures of said evaporator coils, ice trays removably positioned in said ice tray retaining chamber, means comprising a sliding bar for locking said trays in position therein, a second electric switch electrically connected in parallel with said first electric switch and means actuated by said sliding bar and connected to said second switch so as to close said second switch when said ice trays are locked by said sliding bar.

10. A refrigerator comprising a food storage compartment, walls defining a freezing compartment within said food storage compartment and having openings therein, a chilling unit in said freezing compartment, means to supply refrigerant to said chilling unit, means to withdraw vaporous refrigerant from said chilling unit including a compressor, an electric motor operatively connected to said compressor, an electric circuit for said electric motor, a first switch in said circuit, means for operating said switch so as to maintain normal temperatures of said chilling unit, a second switch electrically connected in parallel with said first switch, a handle for operating said second switch, a closure member for one of said openings and means connecting said handle with said closure member so that said closure member closes said opening when the circuit through said second switch is closed.

11. A refrigerator comprising a food storage compartment, walls defining a freezing compartment within said food storage compartment and having openings therein, a chilling unit comprising evaporator coils and an ice tray retaining chamber, means to supply refrigerant to said evaporator coils, means to withdraw vaporous refrigerant from said evaporator coils including a compressor, an electric motor operatively connected to said compressor, an electric circuit for said motor, a first switch in said circuit, means for operating said switch so as to maintain normal temperatures of said evaporator coils, ice trays removably positioned in said ice tray retaining chamber, means comprising a sliding bar for locking said trays in position therein, a second electric switch electrically connected in parallel with said first electric switch, means actuated by said sliding bar and connected to said second switch so as to close said second switch when said ice trays are locked by said sliding bar and means operated by said sliding bar closing one of said openings when said ice trays are locked by said sliding bar.

12. A device of the class described comprising compartments adapted to be maintained at different temperatures, means for obstructing circulation of air between said compartments, and means coordinated therewith for obstructing withdrawal of a commodity from one of the compartments.

13. A plurality of compartments associated in a manner to permit circulation therebetween, means for controlling the temperature of one of the compartments, means for controlling the circulation between the compartments, and means for obstructing the removal of a commodity from one of the compartments, certain of said means being operatively coordinated.

14. In a refrigerating apparatus a food chamber, a freezing compartment in said food chamber, means for obstructing withdrawal of a commodity from said compartment, and means coordinated therewith for controlling the temperature of said compartment.

15. In combination, a food chamber, a freezing compartment in said food chamber for containing an ice tray for holding matter to be frozen, means movable into and out of position for locking the tray in said compartment.

16. In a refrigerating system a food chamber, a freezing compartment in said food chamber for an ice tray, means movable into and out of position to obstruct the withdrawal of the tray from the compartment, and a lever for operating said means.

In tesimony whereof we affix our signatures.

HENRY G. McCOMB.
WILLIAM D. COLLINS.